United States Patent [19]

Raynolds

[11] Patent Number: 5,268,412

[45] Date of Patent: Dec. 7, 1993

[54] POLYMER BLENDS FOR AQUEOUS DISPERSIONS HAVING IMPROVED FREEZE-THAW STABILITY

[75] Inventor: Peter W. Raynolds, Kingsport, Tenn.

[73] Assignee: Eastman Kodak Company, Rochester, N.Y.

[21] Appl. No.: 616,515

[22] Filed: Nov. 21, 1990

[51] Int. Cl.$^5$ .................. C09D 11/10; C08L 25/14
[52] U.S. Cl. .................. 524/513; 523/502; 524/376; 524/389; 525/10; 525/35; 525/167; 525/175
[58] Field of Search .......... 525/167, 175, 10, 35; 523/502; 524/513, 376, 389

[56] References Cited

U.S. PATENT DOCUMENTS

| | | | |
|---|---|---|---|
| 3,546,008 | 12/1970 | Shields et al. | 117/138.8 |
| 3,734,874 | 5/1973 | Kibler et al. | 260/29.2 |
| 3,779,993 | 12/1973 | Kibler et al. | 260/75 |
| 3,919,154 | 11/1975 | Chang et al. | 260/29.4 |
| 4,246,154 | 1/1981 | Yao | 260/29.6 |
| 4,335,220 | 6/1982 | Coney | 523/414 |
| 4,340,519 | 7/1982 | Kotera et al. | 523/414 |
| 4,435,540 | 3/1984 | Kishida et al. | 524/780 |
| 4,704,309 | 11/1987 | Coney et al. | 427/258 |
| 4,738,785 | 4/1988 | Langston et al. | 210/738 |
| 4,812,510 | 3/1989 | Barnett et al. | 524/807 |
| 4,921,899 | 5/1990 | Phan | 525/167 |
| 4,946,932 | 8/1990 | Jenkins | 528/272 |
| 4,954,558 | 9/1990 | Tsaur | 525/460 |

FOREIGN PATENT DOCUMENTS 0152095 8/1988 European Pat. Off. .
1551126 8/1979 United Kingdom .

OTHER PUBLICATIONS

K. M. Chen et al., *Journal of Applied Polymer Science*, 34, pp. 1879–1888 (Oct., 1987).
T. L. McCartney et al., *Polymer Buletin*, 23, pp. 367–371 (1990).
P. Becher and M. N. Yudenfreund (eds.), *Emulsions, Latices and Dispersions*, pp. 99–128 (1978), R. L. Schild et al., "Preparation and Characterization of Polystyrene Latexes with the Ionic Comonomer 2-Acrylamido-2-Methyl Propane Sulfonic Acid".

*Primary Examiner*—Patricia A. Short
*Attorney, Agent, or Firm*—Betty J. James; T. R. Savitsky; William P. Heath, Jr.

[57] ABSTRACT

Disclosed are polymer blends of polyesters or polyesteramides and a polymer containing an acrylamide sulfonate monomer. The blends are preferably prepared by polymerizing monomers in the presence of the polyester or polyesteramide. The blends impart superior freeze-thaw stability to aqueous compositions such as inks.

26 Claims, No Drawings

POLYMER BLENDS FOR AQUEOUS DISPERSIONS HAVING IMPROVED FREEZE-THAW STABILITY

FIELD OF INVENTION

The present invention concerns polymer blends of a polyester or polyesteramide and a polymer containing repeating units from an acrylamide sulfonate compound, as well as a process for preparation thereof. These polymer blends impart improved freeze-thaw stability to aqueous dispersions, especially aqueous inks.

BACKGROUND OF THE INVENTION

There is much interest in water-dispersible polymers for inks because of problems associated with solvent emissions from solvent-based inks.

Certain polyesters are water-dispersible as a result of sulfonate groups on the polyester backbone. These polyesters have been described in, for example, U.S. Pat. Nos. 3,734,874, 3,546,008, and 3,779,993.

Water-dispersible polyesters have been used in textile sizes and have been used to develop aqueous inks. Inks containing a water-dissipatable polyester are well known in the art as disclosed in U.S. Pat. Nos. 4,704,309 and 4,738,785. These inks have many desirable features, including excellent gloss and color development, good rewet characteristics, and low odor. However, because of the wide range of printing conditions and substrates used in the printing industry, a given ink formulation can have ideal properties for some applications and poor properties for other applications. U.S. Pat. No. 4,946,932 teaches preparation of polymer blends by polymerizing certain α, β unsaturated monomers in the presence of a polyester or polyesteramide material. These blends are generally useful in aqueous dispersions such as aqueous inks. Freeze-thaw stability is important in this class of products because without it the product must be very carefully protected, at additional cost, from freezing during shipping and storage. U.S. Pat. No. 4,812,510 teaches that certain latexes containing 0.05–15 parts of a certain acrylamide sulfonate compound (i.e., sodium 2-acrylamido-2-methylpropane sulfonate or "AMPS") have good mechanical, aging and heat stability, and stability with pigments.

I have surprisingly discovered that use of an acrylamide sulfonate compound for preparing polymer blends significantly improves the freeze-thaw stability of aqueous dispersions made from such blends. Such dispersions are useful in many applications such as adhesives, inks and other coatings.

SUMMARY OF THE INVENTION

The present invention is directed to blends useful in aqueous dispersions, especially ink compositions, wherein said blend contains a water-dispersible polyester or polyesteramide and a polymer containing repeating units from an acrylamide sulfonate compound. More specifically, the present invention is directed to a polymer blend comprising:
(A) about 5 to about 75 weight % of a water-dispersible sulfonate group-containing polyester or polyesteramide,
(B) about 25 to about 95 weight % of a polymer comprising:
  (a) about 0.1 to about 20 weight % of repeating units of an acrylamide sulfonate monomer, and
  (b) about 80 to about 99.9 weight % of repeating units from at least one other ethylenically unsaturated monomer.

The Present invention is also directed to a method of preparing a water-dispersed polymer blend comprising the steps of:
(i) preparing an aqueous polymerization mixture by contacting
  (A) a water-dispersible sulfonate group-containing polyester or polyesteramide,
  (B) two or more monomers, wherein said monomers comprise:
    (a) about 0.1 to about 20 weight % of an acrylamide sulfonate monomer, and
    (b) about 80 to about 99.9 weight % of at least one other ethylenically unsaturated monomer,
  (C) a polymerization initiator, and
  (D) water,
(ii) polymerizing said monomers to provide said water-dispersible polymer blend.

The present invention is further directed to an ink composition comprising:
(I) about 5 to about 60 weight % of a polymer blend comprising:
  (A) about 5 to about 75 weight % of a water-dispersible sulfonate group-containing polyester or polyesteramide,
  (B) about 25 to about 95 weight % of a polymer comprising:
    (a) about 0.1 to about 20 weight % of repeating units of an acrylamide monomer, and
    (b) about 80 to about 99.9 weight % of repeating units from at least one other ethylenically unsaturated monomer,
(II) 0 to about 30 weight % of a pigment material,
(III) about 40 to about 90 weight % of water, and
(IV) 0 to about 20 weight % of an alcohol.

DETAILED DESCRIPTION OF THE INVENTION

A preferred polymer blend of the invention comprises:
(A) about 5 to about 75 weight % of at least one water-dispersible sulfonate group-containing polyester or polyesteramide,
(B) about 25 to about 95 weight % of a polymer comprising:
  (a) about 0.1 to 20 weight % of repeating units from sodium 2-acrylamido-2-methylpropane-sulfonate, and
  (b) about 80 to about 99.9 weight % of repeating units from a (meth)acrylate compound, a styrene compound, a vinyl compound, or a mixture thereof.

A more preferred polymer blend of the invention is wherein component (A) is present in an amount of about 15 to about 50 weight %, component (B) is present in an amount of about 50 to about 85 weight %; and component (B) comprises about 0.2 to about 10 weight % of component (B)(a) and about 90 to about 99.7 weight % of component (B)(b) wherein component (B)(b) comprises 0–50 weight % (meth)acrylate compound and 50–100 weight % styrene compound.

An even more preferred polymer blend of the invention is wherein component (A) is present in an amount of about 20 to about 40 weight %, component (B) is present in an amount of about 60 to about 80 weight %; and component (B) comprises about 0.2 to 5 weight % of component (B)(a) and 95 to about 99.5 weight % of component (B)(b), wherein component (B)(b) comprises:
(i) 50-100 weight % of repeating units from styrene, α-methyl styrene, 4-methyl styrene, or a mixture thereof, and
(ii) 0-50 weight % of repeating units from butyl acrylate, ethyl acrylate, propyl acrylate, 2-ethylhexyl acrylate, methyl methacrylate, butyl methacrylate, acrylic acid, methacrylic acid, or a mixture thereof.

Of course, the preferred embodiments described herein for the polymer blend are also applicable to the process for preparing the blends, the dispersions and ink compositions of the invention.

The polyesters or polyesteramides used in this invention are water-dispersible as a result of sulfonate groups on the polyester backbone. Suitable compositions are those described in U.S. Pat. Nos. 3,734,874, 3,546,008, 4,335,220 and 3,779,993, incorporated herein by reference. Basically, these polyesters and polyesteramides are described as having carbonyloxy interconnecting groups in the linear molecular structure wherein up to 80% thereof may be carbonylamido linking groups, the polymer having an inherent viscosity of at least about 0.1, and the polymer consisting essentially of the following components or ester forming or ester-amide forming derivatives thereof;

(a) at least one difunctional dicarboxylic acid;
(b) from about 2 to about 25 mole %, based on a total of all acid, hydroxyl and amino equivalents being equal to 200 mole %, of at least one difunctional sulfomonomer containing at least one metal sulfonate group attached to an aromatic nucleus wherein the functional groups are hydroxy, carboxyl or amino; and
(c) at least one glycol, a mixture of a glycol and a diamine having two —NRH groups, the glycol containing two —CH$_2$—OH groups, or an amino-alcohol having one —C(R)$_2$—OH group and one —NRH group, wherein each R is a hydrogen atom or an alkyl group of 1 to 4 carbons.

The polymer may contain at least one other difunctional reactant selected from a hydroxycarboxylic acid having one —CH$_2$—OH, an aminocarboxylic acid having one —NRH group, wherein each R is an H atom or an alkyl group of 1 to 4 carbon atoms.

The dicarboxylic acid component of the polyester or polyesteramide comprises aliphatic dicarboxylic acids, alicyclic dicarboxylic acids, aromatic dicarboxylic acids, or mixtures of two or more of these acids. Examples of such dicarboxylic acids include succinic; glutaric; adipic; azelaic; sebacic; itaconic; 1,4-cyclohexanedicarboxylic; 1,3-cyclohexanedicarboxylic; maleic; phthalic; terephthalic and isophthalic.

It should be understood that use of the corresponding acid anhydrides, esters, and acid chlorides of these acids is included in the term "dicarboxylic acid."

Other suitable acids are disclosed in U.S. Pat. No. 3,779,993.

The difunctional sulfo-monomer component of the polyester or polyesteramide may advantageously be a dicarboxylic acid or an ester thereof containing a metal sulfonate group or a glycol containing a metal sulfonate group or a hydroxy acid containing metal sulfonate group. The metal ion of the sulfonate salt may be Na$^+$, Li$^+$, K$^+$ and the like. The resulting polyesters or polyesteramides are less readily dissipated by cold water and more readily dissipated by hot water. It is possible to prepare the polyester or polyesteramide using, for example, a sodium sulfonate salt and later by ion-exchange replace this ion with a different ion, and thus alter the characteristics of the polymer. The difunctional monomer component may also be referred to as a difunctional sulfomonomer and is further described hereinbelow.

Advantageous difunctional sulfo-monomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters; metallosulfoaryl sulfonate as described in U.S. Pat. No. 3,779,993.

Particularly superior results are achieved when the difunctional sulfo-monomer components is 5-sodiosulfoisophthalic acid or its esters and the glycol is a mixture of ethylene glycol or 1,4-cyclohexanedimethanol with diethylene glycol.

When the sulfonate-containing difunctional monomer is an acid or its ester, the polyester or polyesteramide should contain at least 8 mole % of said monomer based on total acid content. Total acid content is calculated as the sum of (1) moles of component (a) namely dicarboxylic acids, (2) one-half of the moles of carboxyl-containing compounds of component (d), (3) moles of component (c) which are dicarboxylic acids, and (4) one-half of the moles of component (c) which are monocarboxy-containing compounds.

Useful glycols for preparing copolyesters may consist of aliphatic, alicyclic, and aralkyl glycols. Examples of these glycols include ethylene glycol; diethylene glycol; triethylene glycol; higher molecular weight poly(ethylene glycols) composed of 4 to 50 repeating units; dipropylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Diethylene glycol and 1,4-cyclohexanedimethanol are especially suitable.

Useful polyesters include those wherein the sulfomonomer is a dicarboxylic acid and constitutes about 8 to 50 mole %, preferably about 10 to about 50 mole % based on the sum of (1) the moles of the total dicarboxylic acid content of components (a) and (b), and (2) one-half of the moles of any hydroxycarboxylic acid.

Other useful polyesters include those wherein the sulfomonomer is a glycol and constitutes about 8 mole % to about 50 mole % based on the sum of the total glycol content measured in moles of (b) and (c), and one-half of the moles of any hydroxycarboxylic acid. Thus, a preferred polyester or polyesteramide useful herein comprises a polymer blend wherein said water-dispersible polyester or polyesteramide comprises a polymer having carbonyloxy linking groups in the linear molecular structure wherein up to 80% of the linking groups are carbonylamido linking groups, the polymer having an inherent viscosity of from about 0.1 to about 1.0 measured in a 60/40 parts by weight solution of phenol/tetrachloroethane at 25° C. and at a concentration of 0.5 gram of polymer in 100 mL of the solvent, the polymer containing substantially equimolar proportions of acid equivalents (100 mole %) to hydroxy and amino equivalents (100 mole %), the polymer comprising the reaction products of reactants selected from (a), (b), (c), and (d), or the ester forming or esteramide forming derivatives thereof, as follows, wherein all stated mole percentages are based on the total of all acid, hydroxyl, and amino equivalents being equal to 200 mole %:

(a) at least one difunctional dicarboxylic acid;
(b) from about 4 to about 25 mole % of at least one difunctional sulfomonomer containing at least one metallic sulfonate group or nitrogen-containing nonmetallic sulfonate group attached to an aromatic or cycloaliphatic nucleus wherein the functional groups are hydroxy, carboxyl, or amino;
(c) at least one difunctional reactant selected from a glycol, a mixture of a glycol and diamine having two —NRH groups, the glycol containing two —CH$_2$—OH groups, or amino-alcohols having one —C(R)$_2$—OH group and one —NRH group, or mixtures of said difunctional reactants; and
(d) from none to about 40 mole % of difunctional reactant selected from hydroxycarboxylic acids having one —C(R)$_2$—OH group, aminocarboxylic acids having one —NRH group;
wherein each R in the (c) and (d) reactants is a hydrogen atom or an alkyl group of 1 to 4 carbons.

A preferred polyester has a weight average molecular weight of about 7,000 to about 25,000; an acid moiety of from about 5 to about 25 mole % 5-sodiosulfoisophthalic acid and conversely from about 95 to about 75 mole % isophthalic acid, terephthalic acid, phthalic acid, adipic acid, succinic acid, glutaric acid, maleic acid, 1,4-cyclohexanedicarboxylic acid, 1,3-cyclohexanedicarboxylic acid, or a mixture thereof; and a glycol moiety of 100 mole % ethylene glycol, diethylene glycol, triethylene glycol, propylene glycol, dipropylene glycol, 1,3-propanediol, 1,4-butanediol, 1,5-pentanediol, 1,6-hexanediol, 1,4-cyclohexanedimethanol, 1,3-cyclohexanedimethanol, neopentyl glycol, or a mixture thereof.

More preferably the polyester has an inherent viscosity of from about 0.20 to about 0.38, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 40 mole % 1,4-cyclohexanedimethanol or ethylene glycol or mixtures thereof.

Most preferably the polyester has an inherent viscosity of from about 0.27 to about 0.34, an acid moiety comprising from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

It is known in the art that certain combinations of monomers in certain amounts will result in polyesters that are too crystalline to be useful in aqueous dispersions. For example, terephthalic acid and cyclohexanedimethanol are known to result in crystalline polyesters which generally are poorly dispersible in water. Thus, routine experimentation may be required to arrive at a polyester of sufficient water dispersibility, such as the use of diethylene glycol in combination with cyclohexanedimethanol.

The acrylamide sulfonate monomer or compound useful in the present invention can be of many different types, for example, the acrylamido residue can be acrylamido, methacrylamido or crotonylamido (methyl or H in the α or β position of the acrylamide). The sulfonate residue is preferably a $C_2$-$C_{11}$ alkylsulfonate. Examples include propanesulfonate or a 2-alkylpropanesulfonate where the alkyl is a $C_2$-$C_8$ alkyl group. Specific examples of suitable acrylamide sulfonate monomers include sodium 2-methylacrylamido-propanesulfonate, sodium 2-crotonylamino-propanesulfonate, sodium 2-acrylamido-2-propanesulfonate, sodium 2-methacrylamido-2-methylpropanesulfonate, and sodium 2-crotonylamido-2-methylpropanesulfonate. The most preferred acrylamide sulfonate monomer for use in the invention is sodium 2-acrylamido-2-methylpropanesulfonate ("AMPS").

The other ethylenically unsaturated monomer (i.e., component (B)(b)) can be a (meth)acrylate compound, a styrene compound, a vinyl compound, any mixture thereof or any other suitable ethylenically unsaturated compound. Examples of such compounds include acrylic acid, methacrylic acid, acrylonitrile, methacrylonitrile, acrylamide, methacrylamide, N-methylolacrylonitrile, N-methylolacrylamide, N-methylacrylamide, methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, 2-ethylhexyl acrylate, 2-ethylhexyl methacrylate, stearyl acrylate, stearyl methacrylate, hydroxyethyl acrylate, hydroxyethyl methacrylate, 2-ethoxyethyl acrylate, 2-ethoxyethyl methacrylate, glycidyl acrylate, glycidyl methacrylate, acetoacetoxyethyl acrylate, acetoacetoxyethyl methacrylate, a diol acrylate, a diol methacrylate, vinyl acetate, vinylidene chloride, styrene, alpha-methylstyrene, 3-methylstyrene, 4-methylstyrene, t-butylstyrene, butadiene, 1-methylbutadiene, 2-methylbutadiene, 2-chlorobutadiene, diisobutylene, cyclopentadiene, divinylbenzene, or diallylphthalate.

The styrene monomer useful herein is preferably of the structure

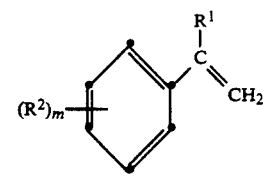

wherein $R^1$ is H or methyl, $R^2$ is a lower alkyl group of 1 to 6 carbon atoms, and m is an integer of 0 to 2. Preferably m is 0 or 1, and $R^2$ is methyl.

The most preferable styrene monomers are styrene, α-methyl styrene, 4-methyl styrene, 3-methyl styrene, t-butyl styrene, and mixtures thereof.

The meth(acrylate) monomer useful herein preferably is of the structure

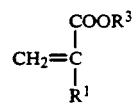

wherein $R^3$ is H or an alkyl group of 1 to 10 carbon atoms, optionally substituted with one or two substituents selected from the group consisting of $C_1$–$C_6$ alkoxy, hydroxy, epoxy, acetoacetoxy and halogen, and $R^1$ has the same meaning as previously defined.

More preferably the meth(acrylate) monomer is selected from the group consisting of acrylic acid, methacrylic acid, acrylonitrile, methacrylonitrile, acrylamide, methacrylamide, N-methylolacrylonitrile, N-methylolacrylamide, N-methylacrylamide, methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, 2-ethylhexyl acrylate, 2-ethylhexyl methacrylate, stearyl acrylate, stearyl methacrylate, hydroxyethyl acrylate, hydroxyethyl methacrylate, 2-ethoxyethyl acrylate, 2-ethoxyethyl methacrylate, glycidyl acrylate, glycidyl methacrylate, acetoacetoxyethyl acrylate, acetoacetoxyethyl methacrylate, a diol acrylate, a diol methacrylate, and mixtures thereof.

Most preferably the (meth)acrylate monomer is selected from the group consisting of butyl acrylate, ethyl acrylate, propyl acrylate, 2-ethylhexyl acrylate, methyl methacrylate, hydroxyethyl methacrylate, glycidyl (meth)acrylate, acetoacetoxyethyl methacrylate, acrylic acid, methacrylic acid, butyl methacrylate, and mixtures thereof.

In the process of the present invention the monomers are polymerized in the presence of the sulfonate-group containing polyester or polyesteramide.

In the process of the present invention the polymer blends of the present invention are prepared in aqueous dispersions. The monomers are generally added to an aqueous dispersion of the water-dispersible polyester and polymerized by free radical initiation in conventional emulsion or suspension polymerization processes. The preferred ratio of polyester to monomer will vary widely and depends on the intended application for the blend.

The polymerization can be initiated by a water-soluble free radical initiator known in the art such as sodium or potassium persulfate or by an oil-soluble initiator such as AIBN or benzoyl peroxide. Other useful initiators include redox initiators such as sodium persulfate/sodium metabisulfite and sodium formaldehyde sulfoxylate/Fe/hydrogen peroxide. Initiators are alternatively referred to herein as catalysts.

A typical temperature range for the polymerization reaction is about 20° C. to about 90° C. with about 50° C. to about 80° C. being preferred.

The sulfonate-group containing polymers which are used in the present invention typically become very viscous at concentrations above about 34% total solids. Thus, the reaction typically is begun with a polyester or polyesteramide dispersion that is about 30% total solids or less. However, the dispersions are prepared at final total solids levels up to about 20% to 60%. A total solids content of about 35% to 50% is preferred. The increase in solids level is achieved during polymerization by controlling the amount of water, if any, which is added along with the monomers. Thus, the method of the present invention for preparing water-dispersed polymer blends can be described as comprising the steps of:

(i) preparing an aqueous polymerization mixture by contacting (A) a water-dispersible sulfonate group-containing polyester or polyesteramide,
(B) two or more monomers, wherein said monomers comprise:
  (a) about 0.1 to about 20 weight % of an acrylamide sulfonate monomer, and
  (b) about 80 to about 99.9 weight % of at least one other ethylenically unsaturated monomer,
(C) a polymerization initiator, and
(D) water,
(ii) polymerizing said monomers to provide said water-dispersible polymer blend.

In the polymerization method it is preferred that component (A) is present in an amount of about 1 to about 45 weight %, component (B) is present in an amount of about 5 to about 57 weight %, component (C) is present in an amount of about 0.01 to about 2 weight %, and component (D) is present in an amount of about 40 to about 80 weight %.

It may be desirable to use an effective amount of a stabilizing compound with the other ethylenically unsaturated monomer (i.e., component (B)(b)), for example, by use of minor amounts of t-butylcatechol to stabilize styrene.

Optionally, the polymerization mixture may contain up to 20 weight % of a $C_1$ to $C_4$ alcohol, especially propanol. Lesser amounts of the alcohol (e.g., up to 5 or 10 weight %) can be employed. It has been found that use of the alcohol results in unexpected advantages in the polymerization reaction, especially achieving smaller particle size. It is anticipated that smaller particle size leads to improved dispersion stability and possibly improved film-forming properties. In the polymerization method of the invention, more preferred is wherein component (A) is present in an amount of about 3 to about 30 weight %, component (B) is present in an amount of about 10 to about 51 weight %, component (C) is present in an amount of about 0.03 to about 0.5 weight %, component (D) is present in an amount of about 40 to about 80 weight %, and the alcohol is present in an amount of up to 10 weight %. Even more preferred is wherein component (A) is present in an amount of about 7 to about 20 weight %, component (B) is present in an amount of about 21 to about 40 weight %, component (C) is present in an amount of about 0.05 to about 0.2 weight %, component (D) is present in an amount of about 50 to about 65 weight %, and the alcohol is present in an amount of up to 5 weight %.

The method of the present invention produces polymer blends which are significantly different from mere physical mixtures of two preformed polymers. The present invention produces an intimate mixture of the polyester (i.e., component (A) of the blend of the invention) and the other polymer (i.e., component (B) of the blend of the invention). The formation of an intimate mixture is remarkable because it has been found that polystyrene and the polyester described in Example 1 hereof are not miscible in one another. This can be demonstrated by scanning electron microscopy (SEM), where a freeze-fractured sample of a thin film of polymer blend is homogeneous and does not show individual regions of the polyester of Example 1 and polystyrene. Upon heating above 120° C., phase separation of the polyester and polystyrene occurs, and discrete regions of the two polymers are obvious by SEM. In a similar way, differential scanning calorimetry (DSC) usually does not show a distinct transition during the first heating cycle, but, after the sample has been heated to 150° C. (causing phase separation) and cooled, a second scan shows two distinct glass transitions (Tg) due to the polyester and the polystyrene. The fact that the polyester and polystyrene are not miscible was established by the failure of the two polymers to melt-blend at 150° C.

The blends produced by the invention method have monodisperse or monomodal particle size distributions. The blends are in the form of latex particles. The particle size distribution of the blends produced by the method of the invention preferably has an average particle size diameter of about 40 to about 300 nanometers (nm).

Useful products for inks are not believed to be produced by merely physically mixing the polyester dispersion and a pre-formed polystyrene latex when there is more polystyrene (on a dry basis) than polyester. When such gross mixtures have been prepared and applied to a surface, they fail to form a film and produce an exceedingly hazy and dull surface. In contrast, the Present invention produces coatings with excellent gloss and adhesion.

In a preferred embodiment, the sulfonate group-containing polymer is prepared, generally by melt polymerization, and an aqueous dispersion containing from about 10% to 35% total solids is prepared from the polyester or polyesteramide directly. A mixture of one or more monomers and the polymerization initiators may then be added to the aqueous dispersion of the polyester or polyesteramide and polymerization initiated to produce an aqueous dispersion. The aqueous dispersion so produced can be prepared with total solids contents from about 20% to about 60%. Preferably, the pH is, or is adjusted to be (for example, by addition of anhydrous sodium carbonate), within the range of about 4–8 in order to minimize hydrolysis of the polyester.

In addition to an alcohol optionally being present, the aqueous dispersion (including the ink compositions hereof) also optionally contains 0.1–10 weight % of 2-(2-ethylhexyloxy)ethanol and 0–10 weight %, optionally 0.1–10 weight %, of at least one other additive and as a wax, a biocide, an antifoam, a surfactant, a transfer agent, or a coalescence aid. This product may then be diluted with water with the addition of more viscosity builder to achieve desired economic and performance properties.

Other usual polymerization adjuvants may be present in the reaction mixture. For instance, the polymerization reaction may be carried out in the presence of wetting, emulsifying and dispersing agents, nonionic surfactants, such as polymers of ethylene and propylene oxide, and surfactants containing ionic groups. However, it is an advantage of the present invention that such surfactants, wetting agents and the like are not required in the invention process or in the aqueous dispersions of the polymer blends.

As is often found in some other emulsion latices, the weight average molecular weight (Mw) of the products of the present invention are typically in the range of 50,000 to 2,000,000. For example, the Mw of the compositions given in Example 3 hereof varied from 100,000 to 300,000, while other compositions within the scope of the invention have molecular weights in excess of 1,000,000. Gel permeation chromatography (gpc) typically shows two peaks, one due to component (A) of the polymer blend of the invention (e.g., in Example 5, 16,500) and one due to component (B) of the polymer blend of the invention (e.g., in Example 5, 171,000). As is known in the art, chain transfer agents, such as mercaptans (dodecyl mercaptan, octyl mercaptan) may be used to regulate the Mw of the copolymer produced. Accordingly, molecular weights of the blends of the invention can vary considerably and, thus, the scope of the present invention should not be limited by molecular weight considerations.

In an alternative embodiment of the process of the present invention, the ratio of components (A), (B)(a) and (B)(b) being added to the reactor at any moment may be varied to achieve particular properties. For instance, in this manner, placement of the acrylamide sulfonate moiety on the surface of the polymer blend particle can be enhanced.

The present invention is also directed to an ink composition containing the polymer blend of the invention which comprises:
(I) about 5 to about 60 weight % of a polymer blend comprising:
 (A) about 5 to about 75 weight % of a water-dispersible sulfonate group-containing polyester or polyesteramide,
 (B) about 25 to about 95 weight % of a polymer comprising:
  (a) about 0.1 to about 20 weight % of repeating units of an acrylamide monomer, and
  (b) about 80 to about 99.9 weight % of repeating units from at least one other ethylenically unsaturated monomer,
(II) 0 to about 30 weight % of a pigment material,
(III) about 40 to about 90 weight % of water, and
(IV) up to about 20 weight % of an alcohol.

The ink composition optionally contains up to about 15 weight %, preferably up to about 3 weight %, of at least one additional additive such as surfactants, antifoams, biocides, waxes, transfer agents, and coalescence aids. The alcohol of the ink composition is preferably a $C_1$ to $C_4$ alcohol such as methanol, ethanol, or propanol.

In the ink composition it is preferred that component (I) comprises about 15 to about 50 weight % of component (I)(A) and about 50 to about 85 weight % of component (I)(B); and component (I)(B) comprises about 0.2 to about 10 weight % of component (I)(B)(a) and about 90 to about 99.8 weight % of component (I)(B)(b). More preferred is wherein component (I) comprises about 20 to about 40 weight % of component (I)(A) and about 60 to about 80 weight % of component (I)(B); and component (I)(B) comprises about 0.2 to about 5 weight % of component (I)(B)(a) and 95 to about 99.8 weight % of component (I)(B)(b).

Exemplary useful C.I. pigments for use in the present invention are given in the following table:

| Pigments | |
|---|---|
| Generic Name | C.A. Index/Chemical Name |
| C.I. Pigment Yellow 17 | Butanamide, 2,2'-[(3,3'-dichloro[1,1'-biphenyl] 4,4'-diyl)bis(azo)bis [N-(2-methoxyphenyl)-3-oxo- |
| C.I. Pigment Blue 27 | Ferrate (4-1), hexakis (cyano-C)-ammonium iron (3+)(1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethyl- |

-continued

| Pigments | |
|---|---|
| Generic Name | C.A. Index/Chemical Name |
| | amino)-3-(ethylimino)-2,7-dimethyl-3H-xanthen-9-yl]-, ethyl ester, w/molybdenum tungsten hydroxide oxide phosphate |
| C.I. Pigment Red 81:3 | Benzoic acid, 2-[6-ethylamino)-3-ethylimino)-2,7-dimethyl-3H-xanthen-9-yl]-, ethyl ester, molybdate-silicate |
| C.I. Pigment Red 81:x | Benzoic acid, 2-[6-(ethylamino)-3-(ethylimino)-2,7-dimethyl-3H-xanthen-9-yl]-, ethyl ester, molybdate-phosphate |
| C.I. Pigment Yellow 83 | Butanamide, 2,2'-[(3,3'-dichloro[1,1'-biphenyl]-4,4'-diyl)bis(azo)bis[N-(4-chloro-2,5-dimethoxyphenyl)-3-oxo- |
| C.I. Pigment Red 57:1 | 2-Naphthalenecarboxylic acid, 3-hydroxy-4-[(4-methyl-2-sulfophenyl)azo]-, calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-(phenylamino)-phenyl]-[4-(phenylimino)-2,5-cyclohexadien-1-ylidene]methyl]-phenyl] amino]- |
| C.I. Pigment Red 48:1 | 2-Naphthalenecarboxylic acid, 4-[(5-chloro-4-methyl-2-sulfophenyl)azo]-3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy-, calcium salt (1:1) |
| C.I. Pigment Violet 1 | Ethanaminium, N-[9-(2-carboxyphenyl)-6-(diethylamino)-3H-xanthen-3-ylidene]-N-ethyl-, molybdatetungstate-phosphate |
| C.I. Pigment White 6 | Titanium oxide (TiO$_2$) |
| C.I. Pigment Blue 15 | Copper, [29H, 31H-phthalocyaninato (2-)-N$^{29}$, N$^{30}$, N$^{31}$, N$^{32}$]-, (Sp-4-1)- |
| C.I. Pigment Yellow 12 | Butanamide, 2,2'-[(3,3'-dichloro[1,1'-biphenyl]-4,4'-diyl)bis(azo)]bis[3-oxo-N-phenyl- |
| C.I. Pigment Blue 56 | Benzenesulfonic acid, 2-methyl-4-[[4-[[4-[(3-methylphenyl)amino] phenyl]-[4-[(3-methylphenyl)-imino]-2-5-cyclohexadien-1-ylidene]methyl]-phenyl] amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis-[N-(2-methylphenyl)-3-oxo- |

-continued

| Pigments | |
|---|---|
| Generic Name | C.A. Index/Chemical Name |
| C.I. Pigment Red 48:2 | 2-Naphthalenecarboxylic acid, 4-[(5-chloro-4-methyl-2-sulfophenyl)-azo]-3-hydroxy-, calcium salt (1:1) |
| C.I. Pigment Blue 15:3 | Copper, [29H, 31H-phthalocyaninato (2-)-N$^{29}$, N$^{30}$, N$^{31}$, N$^{32}$]-, (SP-4-1)- |
| C.I. Pigment Yellow 1 | Butanamide, 2-[(4-methyl-2-nitrophenyl)azo]-3-oxo-N-phenyl- |
| C.I. Pigment Yellow 3 | Butanamide, 2-[(4-chloro-2-nitrophenyl) azo]-N-(2-chlorophenyl)-3-oxo- |
| C.I. Pigment Yellow 13 | Butanamide, 2,2'-[(3,3'-dichloro[1,1'-biphenyl]-4,4'-diyl)bis(azo)]bis [N-(2,4-dimethylphenyl)-B-oxo- |
| C.I. Pigment Orange 16 | Butanamide, 2,2'-[(3,3'-dimethoxy[1,1'-biphenyl]-4,4'-diyl)bis(azo)]bis [3-oxo-N-phenyl- |
| C.I. Pigment Yellow 55 | Butanamide, 2,2'-[(3,3'-dichloro[1,1'-biphenyl]-4,4'-diyl)bis(azo)]bis [N-(4-methylphenyl)-3-oxo- |
| C.I. Pigment Red 41 | 3H-Pyrazol-3-one,4,4'-[(3,3'-dimethoxy[1,1'-biphenyl]-4,4'-diyl)bis (azo)]bis[2,4-dihydro-5-methyl-2-phenyl- |
| C.I. Pigment Orange 34 | 3H-Pyrazol-3-one, 4,4'-[(3,3'-dichloro[1,1'-biphenyl]-4,4'-diyl)bis (azo)]bis[2,4-dihydro-5-methyl-2-(4-methylphenyl)- |
| C.I. Pigment Blue 62 | 4,4'-Bis(diethylamino) benzophenone condensed with N-ethyl-1-naphthylamine in toluene with phosphorous oxychloride and converted to the copper ferrocyanide salt (PTMA salt in P.Blue 1) |
| C.I. Pigment Red 22 | 2-Naphthalenecarboxamide, 3-hydroxy-4-[(2-methyl-5-nitrophenyl)azo]-N-phenyl- |
| C.I. Pigment Red 170 | 2-Naphthalenecarboxamide, 4-[[(4-(aminocarbonyl) phenyl]azo]-N-(2-ethoxyphenyl)-3-hydroxy- |
| C.I. Pigment Red 88 | Benzo[b]thiophen-3(2H)-one, 4,7-dichloro-2-(4,7-dichloro-3-oxobenzo[b]-thien-2(3H)-ylidene)- |
| C.I. Pigment Yellow 151 | A diazotized aniline derivative coupled with an acetoacetyl derivative of 5-aminobenzimidazolone |
| C.I. Pigment Red 184 | A diazotized substituted aniline coupled with a derivative of 3-hydroxy-2-naphthanilide |
| C.I. Pigment Blue 1:2 | Ethanaminium, N-[4-[[4-(diethylamino)phenyl] [4-(ethylamino)-1-1 naphthalenyl]methylene]-2,5-cyclohexadien-1-ylidene]-N-ethyl-, [orthosilicato(4-)] hexatriacontaoxo-dodecamolybdate(4)-(4:1) |
| C.I. Pigment Red 3 | 2-Naphthalenol, 1-[(4-methyl-2-nitrophenyl)azo]- |

-continued

| Pigments | |
|---|---|
| Generic Name | C.A. Index/Chemical Name |
| C.I. Pigment Blue 15:1 | Copper, [29H, 32H-phthalocyaninato(2-)-$N^{29}$, $N^{30}$, $N^{31}$, $N^{32}$]-, (SP-4-1)- or Copper, [chloro-29H, 31H-phthalocyaninato (2-1)-$N^{29}$, $N^{30}$, $N^{31}$, $N^{32}$]- |
| C.I. Pigment Red 23 | 2-Naphthalenecarboxamide, 3-hydroxy-4-[(2-methoxy-5-nitrophenyl)azo]-N-(3-nitrophenyl)- |
| C.I. Pigment Red 112 | 2-Naphthalenecarboxamide, 3-hydroxy-N-(2-methylphenyl)-4-[(2,4,5-trichlorophenyl)azo]- |
| C.I. Pigment Yellow 126 | A tetrazotized derivative of 3,3-dichlorobenzidene coupled with a derivative of acetoacetanilide |
| C.I. Pigment Red 169 | 3-Ethylamino-p-cresol condensed with phthalic anhydride, esterified with ethanol and a mineral acid, and converted to the copper ferrocyanide complex (chloride salt is C.I. Basic Red 1, PTMA salt is P.Red 81:1). |
| C.I. Pigment Orange 13 | 3H-Pyrazol-3-one, 4,4'-[(3,3'-dichloro[1,1'-biphenyl]-4,4'-diyl)bis(azo)]bis[2,4-dihydro-5-methyl-2-phenyl- |
| C.I. Pigment Red 10 | 2-Naphthalenecarboxamide, 4-[(2,5-dichlorophenyl)azo]-3-hydroxy-N-(4-methylphenyl)- |
| C.I. Pigment Blue 1:X | Ethanaminium, N-[4-[[4-(diethylamino)phenyl][4-(ethylamino)-1-naphthalenyl]methylene]-2,5-cyclohexadien-1-ylidene]-N-ethyl-, molybdatephosphate |
| C.I. Pigment Yellow 42 | Iron oxide ($Fe_2O_3$) hydrate |
| C.I. Pigment Red 101 | Iron oxide ($Fe_2O_3$) |
| C.I. Pigment Brown 6 | Iron oxide ($Fe_2O_3$), some FeO and $Fe_2O_3.H_2O$ |
| C.I. Pigment Brown 7 | Iron oxide ($Fe_2O_3$) plus varying amounts of clay |
| C.I. Pigment Brown 7:X | $Fe_2O_3.xMnO_2$ with varying amounts of clay |
| C.I. Pigment Black 11 | $FeO.Fe_2O_3$ |
| C.I. Pigment Metal 1 | Aluminum |
| C.I. Pigment Metal 2 | Copper, zinc |

Freeze-thaw failure is characterized by, among other things, an increase in viscosity of the dispersion after freezing and thawing. Freeze-thaw stability is important for many aqueous dispersions such as water based inks, adhesives, and other coatings. A method used to test freeze-thaw stability is described in Example 1 hereof. In the most dramatic cases of freeze-thaw instability, the material will gel, which is to say it will not flow at all upon thawing. In less severe cases, the viscosity will increase. The importance of the viscosity change depends on the intended use of the product. In general, if a viscosity increase is observed after the first freeze-thaw cycle, subsequent freeze-thaw cycles will produce further increases in viscosity. The adverse effects of freeze-thaw failure are not limited to viscosity. Haze increases, particle size generally increases, precipitates may form, and the end-use properties of the product, especially clarity of the film and gloss, may change.

The aqueous dispersions of the present invention, especially the overprint and other ink compositions, have significantly improved freeze-thaw stability as compared to control aqueous dispersions not employing the acrylamide sulfonate monomer.

The aqueous inks of the invention also preferably have improved block resistance, gloss and/or water resistance as compared to prior art ink compositions.

The invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

An emulsion is formed from 1093 g of 33.22% dispersion of a water dispersible polyester, 1522 g of deionized water, 93 g of a 58% water solution of AMPS (Lubrizol LZ 2403A), and 1398 g of styrene stabilized with 10–15 ppm of t-butylcatechol. The polyester is prepared from 82 mole % isophthalic acid, 18 mole % 5-(sodiosulfo)isophthalic acid, 54 mole % diethylene glycol, and 46 mole % cyclohexanedimethanol. It has a Tg of 55° C. and an I.V. of 0.33 in a 60/40 phenol/tetrachloroethane mixture. A catalyst solution is prepared from 4.5 g of potassium persulfate and 281 g of water. A 5-liter round bottom reactor equipped with a bottom-scraping mechanical stirrer and temperature controller is charged with 318 g of the emulsion, 151 g of distilled water, 141 g of the catalyst solution and 1.8 g of anhydrous sodium carbonate. Nitrogen is bubbled through the mixture for 15 minutes. The reactor is heated to 70° C., whereupon an exothermic reaction begins. The temperature rises to 82° C. and then begins to decrease. At this point, the remainder of the catalyst solution is pumped into the pot over a period of 3 hours, and the remaining emulsion is pumped in over 2.5 hours. After all of the emulsion is in, the reaction is cooked at 80° C. for two hours. The latex is cooled and filtered through a 110 micron polyethylene mesh to remove 7.5 g of solid material. The milky white product contains 39.36% non-volatile matter, has a viscosity of 11.5 cps (Brookfield LVT, #2 spindle, 25° C., 60 rpm), a particle diameter of 123 nm, pH of 6.4, and a conductivity of 5.77 milliSeimens/cm. The latex is stable to heating at 50° C. for one week. The residue from drying the latex in a 115° C. oven for 16 hours has glass transition temperatures (Tg) of 55° and 111° C., an inherent viscosity (IV) of 0.864 in 60/40 phenol/tetrachloroethane mixture. Water resistance is measured by adding 5% by weight of n-propanol and 5% of a 40% suspension of a blue pigment (Blue 15:3). "Drawdowns" are prepared as is typically done in the trade, using a #2 K-coater rod on aluminum foil; the aluminum surface is not cleaned or pre-treated. The drawdown is placed in a 100° C. forced air oven for 3 seconds. The next day a drop of distilled water is placed on the surface. After 20 minutes, the drop is rubbed off using a tissue and a weight that exerts 2 psi pressure. The extent of removal of the ink is judged according to a 1 to 5 scale, where 1 indicates complete removal of the ink, and 5 indicates no visible marring of the ink. This composition has a water resistance rating of 5, indicating no damage to the ink surface. Freeze-thaw stability is tested by freezing the product overnight in a −13° C. freezer, followed by thawing for 1 day. Products that fail generally solidify; products that pass suffer no visual change and have a viscosity close to that of the starting dispersion. The product prepared here is virtually unchanged after five freeze-thaw cycles.

Example 2

Comparative Example

A latex similar to the one described in Example 1 is prepared, but with the omission of AMPS. Thus, a milky white latex is made starting with an emulsion prepared from 1013 g of distilled water, 1367 g of a 33.22% dispersion of water dispersible polyester and 1816 g of styrene, following the detailed procedure above. This product has 49.41% non-volatile matter, a viscosity of 1940, a particle diameter of 167 nm, ph of 6.12 and a conductivity of 3.81 mS/cm. The dispersion is stable after being heated to 50° C. for one week. The dried dispersion has Tg's of 48° and 108° C. and an IV of 0.740. The water resistance of the product is 5. This product solidifies (fails) after one freeze-thaw cycle.

carbonate, 42.7 g of a 50% solution of AMPS in water (Lubrizol LZ 2405) and 1472 g of styrene. A catalyst solution is prepared from 4.5 g of potassium persulfate and 193 g of water. A five liter pot is charged with 318 g of the emulsion and 102 g of water. Following the detailed procedure in Example 1, a latex is obtained with 46.92% non-volatile matter. It has a viscosity of 31 cps, a particle diameter of 112 nm, a pH of 5.36. A dried sample has a Tg of 112° C. and an IV of 0.638. Gel permeation chromatography (GPC) reveals two peaks, one with a weight average molecular weight of 16,500 (corresponding to the polyester) and 171,000 (corresponding to the styrene-AMPS copolymer). The sample is stable to five freeze-thaw cycles and to heating at 50° C. for a week. The water resistance has a rating of 5, and printed surfaces do not stick together (block) when subjected to a pressure of 0.5 psi in an environment controlled at 120° F. dry bulb, 110° F. wet bulb; this corresponds to approximately 75% relative humidity at 120° F. Gloss is determined at a 60° angle with a DR

| Freeze-Thaw Behavior of Latexes with Varying Amounts of AMPS | | | | | | | | | |
|---|---|---|---|---|---|---|---|---|---|
| Sample No. | % Polyester | % Styrene | % AMPS | Orig. Visc. | 1 Cycle | 2 Cycles | 3 Cycles | 4 Cycles | 5 Cycles |
| 1 | 50 | 50 | 0 | 37 | Pass | Pass | Pass | Pass | Pass |
| 2 | 40 | 60 | 0 | 84 | 166 | 514 | Gel | — | — |
| 3 | 40 | 59 | 1 | 100 | Pass | Pass | Pass | Pass | Pass |
| 4 | 30 | 70 | 0 | 38 | Gel | — | — | — | — |
| 5 | 30 | 69 | 1 | 21 | 28 | 33 | 38 | 44 | 45 |
| 6 | 30 | 68 | 2 | 20 | 22 | 24 | 21 | 21 | 22 |
| 7 | 20 | 80 | 0 | 23 | Gel | — | — | — | — |
| 8 | 20 | 77 | 3 | 12 | Pass | Pass | Pass | Pass | Pass |
| 9 | 10 | 90 | 0 | 25 | Gel | — | — | — | — |
| 10 | 10 | 87 | 3 | 32 | 28 | 28 | 26 | 32 | 24 |
| 11 | 0 | 100 | 0 | 12 | Gel | — | — | — | — |
| 12 | 0 | 97 | 3 | 15 | 14 | 13 | 18 | 18 | 19 |

Percent polyester, styrene and AMPS refer to weight percent, dry basis, by formulation.
Polyester is the polyester described in Example 1.
AMPS is sodium 2-acrylamido-2-methyl-propanesulfonate, LZ 2403.
Viscosity is expressed in cps (centipoise) and was determined at 25° C. using a Brookfield LVT viscometer with a #2 spindle.
"Cycle" refers to one freeze-thaw cycle; freezing at −13° C. for at least 16 hours followed by thawing at room temperature.
"Pass" indicates that the sample was evaluated visually and found to be unchanged in viscosity and containing no gel, chunks, deposits or sediment.

EXAMPLE 4

An emulsion is formed from 1148 g of a 33.22% dispersion of the water dispersible polyester described in Example 1, 656 g of water, 1.8 g of anhydrous sodium carbonate, and 967 grams of styrene. A second emulsion is formed from 328 grams of distilled water, 40.9 g of a 50% solution of AMPS (Lubrizol LZ 2405), 574 g of the 33.22% dispersion of polyester and 484 g of styrene. A catalyst solution is prepared from 4.5 g of ammonium persulfate and 216 g of water. The 5 liter reactor is charged with 318 g of the first emulsion and 126 g of water. Following the detailed procedure of Example 1, the first emulsion is pumped into the reactor, followed by the second, over a total time of 1 hour. The product contains 44.95% non-volatile matter, has a viscosity of 22 cps, a particle diameter of 149 nm, and a pH of 6.55. The latex is stable to heating at 50° C. for one week and is freeze-thaw stable over 5 cycles. The residue from drying the latex in a 115° C. oven for 16 hours has a glass transition temperature of 113° C.

EXAMPLE 5

An emulsion is formed from 1933 g of a 33.1% dispersion of the water dispersible polyester described in Example 1, 796 g of water, 1.8 g of anhydrous sodium Lange Labor-Reflektometer. A sample of the latex is diluted to 31% non-volatile matter and printed over 30 pound clay coated white paper which has previously been printed with a red ink. The overprinted surface has a gloss of 58%. The addition of 1% of 2-(2-ethylhexyloxy)ethanol increases the gloss to 62%.

The invention has been described in detail with particular reference to preferred embodiments thereof, but it will be understood that variations and modifications can be effected within the spirit and scope of the invention.

I claim:

1. An aqueous dispersion comprising a polymer blend further comprising:
(A) about 20 to about 40 weight % of water-dispersible sulfonate group-containing polyester or polyesteramide, comprising repeat units from
   (a) at least one difunctional aromatic, saturated aliphatic or saturated alicyclic dicarboxylic acid;
   (b) from about 2 to about 25 mole %, based on a total of all acid, hydroxyl and amino equivalents being equal to 200 mole %, of at least one difunctional sulfomonomer containing at least one metal sulfonate group attached to an aromatic nucleus wherein the functional groups are hydroxy, carboxyl or amino; and
(c) at least on glycol, a mixture of a glycol and a diamine having two —NRH groups, the glycol containing two —CH$_2$—OH groups, or an amino-alcohol having one —C(R)$_2$—OH group and one —NRH group, wherein each R is a hydrogen atom or an alkyl group of 1 to 4 carbons.
(B) about 60 to about 80 weight % of a polymer comprising:
(a) about 0.2 to about 5 weight % of repeating units of an acrylamide sulfonate monomer, and
(b) about 95 to about 99.8 weight % of repeating units from at least one other ethylenically unsaturated monomer comprising
(e) 50–100 weight % of repeating units from styrene, α-methyl styrene, 4-methyl styrene, or a mixture thereof, and
(ii) 0–50 weight % of repeating units from butyl acrylate, ethyl acrylate, propyl acrylate, 2-ethylhexyl acrylate, methyl methacrylate, butyl methacrylate, acrylic acid, methacrylic acid, or a mixture thereof.

2. The aqueous dispersion of claim 1 wherein said acrylamide sulfonate monomer of component (B)(a) is sodium 2-methylacrylamido-propanesulfonate, sodium 2-crotonylamino-propanesulfonate, sodium 2-acrylamido-2-propanesulfonate, sodium 2-methacrylamido-2-methylpropanesulfonate, sodium 2-crotonylamido-2-methylpropanesulfonate, or sodium 2-acrylamido-2-methylpropanesulfonate.

3. The aqueous dispersion of claim 1 wherein component (B) comprises
(a) about 0.2 to about 5 weight % of repeating units from sodium 2-acrylamido-2-methylpropanesulfonate.

4. The aqueous dispersion of claim 1 wherein said water-dispersible polyester or polyesteramide comprises a polymer having an inherent viscosity of from about 0.1 to about 1.0 measured in a 60/40 parts by weight solution of phenol/tetrachloroethane at 25° C. and at a concentration of 0.5 gram of polymer in 100 mL of the solvent, the polymer further comprising the reaction product of reactant (d), or the ester forming or esteramide forming derivatives thereof, as follows, wherein all stated mole percentages are based on the total of all acid, hydroxyl, and amino equivalents being equal to 200 mole %; and wherein said reactant (d) is from none to about 40 mole % of difunctional reactant selected from hydroxycarboxylic acids having one —C(R)$_2$—OH group, aminocarboxylic acids having one —NRH group; wherein each R in the (d) reactant is a hydrogen atom or an alkyl group of 1 to 4 carbons.

5. The aqueous dispersion of claim 4 wherein said water-dispersible polyester has a weight average molecular weight of about 7,000 to about 25,000; an acid moiety of from about 5 to about 25 mole % 5-sodiosulfoisophthalic acid and conversely from about 95 to about 75 mole % isophthalic acid; terephthalic acid, phthalic acid, adipic acid, succinic acid, glutaric acid, maleic acid, 1,4-cyclohexanedicarboxylic acid, 1,3-cyclohexanedicarboxylic acid, or a mixture thereof; and a glycol moiety of 100 mole % ethylene glycol, diethylene glycol, triethylene glycol, propylene giycol, dipropylene glycol, 1,3-propanediol, 1,4-butanediol, 1,5-pentanediol, 1,6-hexanediol, 1,4-cyclohexanedimethanol, 1,3-cyclohexanedimethanol, neopentyl glycol, or a mixture thereof.

6. The aqueous dispersion of claim 5 comprising about 20 to about 60 weight % solids.

7. The aqueous dispersion of claim 6 containing up to 10 weight % of a C$_1$ to C$_4$ alcohol.

8. The aqueous dispersion of claim 5 comprising about 30 to about 55 weight % solids.

9. The aqueous dispersion of claim 8 containing up to 10 weight % of a C$_1$ to C$_4$ alcohol.

10. The aqueous dispersion of claim 4 wherein said water-dispersible polyester has an inherent viscosity of from about 0.20 to about 0.38, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 40 mole % 1,4-cyclohexanedimethanol or ethylene glycol or mixtures thereof.

11. The aqueous dispersion of claim 10 wherein said acid moiety comprises from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

12. The aqueous dispersion of claim 1 prepared by polymerizing monomers to form compound (B) in the presence of said polyester or polyesteramide.

13. The aqueous dispersion of claim 1 comprising about 20 to about 60 weight % solids.

14. The aqueous dispersion of claim 1 comprising about 30 to about 55 weight % solids.

15. The aqueous dispersion of claim 1 containing up to 20 weight % of a C$_1$ to C$_4$ alcohol.

16. The polymer dispersion of claim 15 containing 0.1–10 weight % of 2-(2-ethylhexyloxy)ethanol and 0–10 weight % of at least one other additive selected from the group consisting of an antifoam, a biocide, a wax, a surfactant, a transfer agent and a coalescence aid.

17. The aqueous dispersion of claim 1 containing up to 10 weight % of a C$_1$ to C$_4$ alcohol.

18. The polymer dispersion of claim 1 containing 0.1–10 weight % of 2-(2-ethylhexyloxy)ethanol and 0–10 weight % of at least one other additive selected from the group consisting of an antifoam, a biocide, a wax, a surfactant, a transfer agent and a coalescence aid.

19. An ink composition comprising:
(I) about 5 to about 60 weight % of, an aqueous dispersion comprising a polymer blend further comprising:
(A) about 20 to about 40 weight % of a water-dispersible sulfonate group-containing polyester or polyesteramide, comprising repeat units from
(a) at least one difunctional aromatic, saturated aliphatic or saturated alicyclic dicarboxylic acid;
(b) from about 2 to about 25 mole %, based on a total of all acid, hydroxyl and amino equivalents being equal to 200 mole %, of at least one difunctional sulfomonomer containing at least one metal sulfonate group attached to an aromatic nucleus wherein the functional groups are hydroxy, carboxyl or amino; and
(c) at least one glycol, a mixture of a glycol and a diamine having two —NRH groups, the glycol containing two —CH$_2$—OH groups, or an amino-alcohol having one —C(R)$_2$—OH group and one —NRH group, wherein each R is a hydrogen atom or an alkyl group of 1 to 4 carbons.

(B) about 60 to about 80 weight % of a polymer comprising:
  (a) about 0.2 to about 5 weight % of repeating units of an acrylamide sulfonate monomer, and
  (b) about 95 to about 99.8 weight % of repeating units from at least one other ethylenically unsaturated monomer comprising
    (i) 50–100 weight % of repeating units from styrene, α-methyl styrene, 4-methyl styrene, or a mixture thereof, and
    (ii) 0–50 weight % of repeating units from butyl acrylate, ethyl acrylate, propyl acrylate, 2-ethylhexyl acrylate, methyl methacrylate, butyl methacrylate, acrylic acid, methacrylic acid, or a mixture thereof,
(II) 0 to about 30 weight % of a pigment material,
(III) about 40 to about 90 weight % of water, and
(IV) 0 to about 20 weight % of an alcohol.

20. The ink composition of claim 19 wherein said acrylamide sulfonate monomer of component (I)(B)(a) is sodium 2-methylacrylamido-propanesulfonate, sodium 2-crotonylamino-propanesulfonate, sodium 2-acrylamido-2-propanesulfonate, sodium 2-methacrylamido-2-methylpropanesulfonate, sodium 2-crotonylamido-2-methylpropanesulfonate, or sodium 2-acrylamido-2-methylpropanesulfonate.

21. The ink composition of claim 19 wherein component (B) comprises
(a) about 0.2 to about 5 weight % of repeating units from sodium 2-acrylamido-2-methylpropanesulfonate.

22. The ink composition of claim 19 wherein said water dispersible polyester or polyesteramide of component (I)(A) comprises a polymer having an inherent viscosity of from about 0.1 to about 1.0 measured n a 60/40 parts by weight solution of phenol/tetrachloroethane at 25° C. and at a concentration of 0.5 gram of polymer in 100 mL of the solvent, the polymer further comprising the reaction product of reactant (d), or the ester forming or esteramide forming derivatives thereof, as follows, wherein all stated mole percentages are based on the total of all acid, hydroxyl, and amino equivalents being equal to 200 mole %; and wherein said reactant (d) is from none to about 40 mole % of difunctional reactant selected from hydroxycarboxylic acids having one —C(R)$_2$—OH group, aminocarboxylic acids having one —NRH group; wherein each R in the (d) reactant is a hydrogen atom or an alkyl group of 1 to 4 carbons.

23. The ink composition of claim 22 wherein said water dispersible polyester has a weight average molecular weight of about 7,000 to about 25,000; an acid moiety of from about 5 to about 25 mole % 5-sodiosulfoisophthalic acid and conversely from about 95 to about 75 mole % isophthalic acid, terephthalic acid, phthalic acid, adipic acid, succinic acid, glutaric acid, maleic acid, 1,4-cyclohexanedicarboxylic acid, 1,3-cyclohexanedicarboxylic acid, or a mixture thereof; and a glycol moiety of 100 mole % ethylene glycol, diethylene glycol, triethylene glycol, propylene glycol, dipropylene glycol, 1,3-propanediol, 1,4-butanediol, 1,5-pentanediol, 1,6-hexanediol, 1,4-cyclohexanedimethanol, 1,3-cyclohexanedimethanol, neopentyl glycol, or a mixture thereof.

24. The ink composition of claim 19 wherein said pigment material of component (II) is one or mixture of the following color index materials: C.I. Pigment Yellow 17, C.I. Pigment Blue 27, C.I. Pigment Red 49:2, C.I. Pigment Red 81:1, C.I. Pigment Red 81:3, C.I. Pigment Red 81:x, C.I. Pigment Yellow 83, C.I. Pigment Red 57:1, C.I. Pigment Red 49:1, C.I. Pigment Violet 23, C.I. Pigment Green 7, C.I. Pigment Blue 61, C.I. Pigment Red 48:1, C.I. Pigment Red 52:1, C.I. Pigment Violet 1, C.I. Pigment White 6, C.I. Pigment Blue 15, C I. Pigment Yellow 12, C.I. Pigment Blue 56, C.I. Pigment Orange 5, C.I. Pigment Black 7, C.I. Pigment Yellow 14, C.I. Pigment Red 48:2, C.I. Pigment Blue 15:3, C.I. Pigment Yellow 1, C.I. Pigment Yellow 3, C.I. Pigment Yellow 13, C.I. Pigment Orange 16, C.I. Pigment Yellow 55, C.I. Pigment Red 41, C.I. Pigment Orange 34, C.I. Pigment Blue 62, C.I. Pigment Red 22, C.I. Pigment Red 170, C.I. Pigment Red 88, C.I. Pigment Yellow 151, C.I. Pigment Red 184, C.I. Pigment Blue 1:2, C.I. Pigment Red 3, C.I. Pigment Blue 15:1, C.I. Pigment Red 23, C.I. Pigment Red 112, C.I. Pigment Yellow 126, C.I. Pigment Red 169, C.I. Pigment Orange 13, C.I. Pigment Red 1-10, 12, C.I. Pigment Blue 1:X, C.I. Pigment Yellow 42, C.I. Pigment Red 101, C.I. Pigment Brown 6, C.I. Pigment Brown 7, C.I. Pigment Brown 7:X, C.I. Pigment Black 11, C.I. Pigment Metal 1, or C.I. Pigment Metal 2.

25. The ink composition of claim 19 additionally comprising up to 15 weight % of at least one other additive selected from the group consisting of a wax, a biocide, a surfactant, a transfer agent, a coalescence aid, and an antifoam.

26. The ink composition of claim 19 additionally comprising 0.1–10 weight % of 2-(2-ethylhexyloxy)ethanol and 0–10 weight % of at least one other additive selected from the group consisting of a wax, a biocide, a surfactant, a transfer agent, a coalescence aid, and an antifoam.

* * * * *

UNITED STATES PATENT AND TRADEMARK OFFICE
CERTIFICATE OF CORRECTION

PATENT NO. : 5,268,412
DATED : December 7, 1993
INVENTOR(S) : Raynolds

It is certified that error appears in the above-indentified patent and that said Letters Patent is hereby corrected as shown below:

Column 16, line 59, (Claim 1, line 3), please insert "a" after "of".

Column 17, line 3, (Claim 1, line 3), please delete "on" and insert "one" therefor.

Column 17, line 8, (Claim 1, line 8), please delete the "." at the end of the line and insert "," therefor.

Column 17, line 16, (Claim 1, line 16), please delete "(e)" and insert "(i)" therefor.

Column 18, line 48, (Claim 19, line 2), please delete the "," after the word "of".

Column 18, line 68, (Claim 19, line 22), please delete the "." at the end of the line and insert "," therefor.

Column 20, line 14, (Claim 24, line 2), please insert the word "a" after the word "or".

Signed and Sealed this

Fifteenth Day of November, 1994

Attest:

BRUCE LEHMAN

*Attesting Officer*         *Commissioner of Patents and Trademarks*